United States Patent [19]
Cole et al.

[11] Patent Number: 5,875,697
[45] Date of Patent: Mar. 2, 1999

[54] APPARATUS FOR CONVEYING FOOD PRODUCTS OF VARYING SIZES

[75] Inventors: Eugene H. Cole; Charles E. Rowell, both of Valparaiso, Ind.

[73] Assignee: Urschel Laboratories Inc., Valparaiso, Ind.

[21] Appl. No.: 691,920

[22] Filed: Aug. 1, 1996

[51] Int. Cl.$^6$ .............................. B65G 15/14; B65G 15/62
[52] U.S. Cl. .................. 83/435.2; 198/626.4; 198/626.6; 198/823; 198/841; 83/932
[58] Field of Search ............................. 198/626.4, 626.6, 198/823, 841; 83/161, 425, 431, 435.2

[56] References Cited

U.S. PATENT DOCUMENTS

| | | |
|---|---|---|
| 1,345,454 | 7/1920 | Mascart . |
| 2,205,702 | 6/1940 | Stewart et al. . |
| 2,847,114 | 8/1958 | Orr ......................................... 198/806 |
| 2,961,020 | 11/1960 | Minami . |
| 2,966,254 | 12/1960 | Kaiser . |
| 3,109,469 | 11/1963 | Urschel et al. . |
| 3,170,564 | 2/1965 | Gatto . |
| 3,468,409 | 9/1969 | Ball . |
| 3,521,322 | 7/1970 | Michael et al. . |
| 3,762,534 | 10/1973 | Bresinsky .............................. 198/626.4 |
| 3,850,213 | 11/1974 | Keaton . |
| 4,230,218 | 10/1980 | Kunzmann . |
| 4,230,221 | 10/1980 | Bresinsky .............................. 198/626.4 |
| 4,316,411 | 2/1982 | Keaton . |
| 4,502,586 | 3/1985 | Dusel et al. . |
| 4,611,646 | 9/1986 | Wassmer et al. . |
| 4,766,793 | 8/1988 | Fischer et al. . |
| 4,832,186 | 5/1989 | Conrad ..................................... 198/806 |
| 5,044,240 | 9/1991 | Fischer et al. . |
| 5,331,874 | 7/1994 | Foster et al. . |
| 5,350,053 | 9/1994 | Archer .................................... 198/841 |

OTHER PUBLICATIONS

"Rail Design" Valu Guide p. 1, Sep. 1987.

*Primary Examiner*—William E. Terrell
*Assistant Examiner*—Mark Deuble
*Attorney, Agent, or Firm*—Bacon & Thomas

[57] ABSTRACT

A conveying apparatus is disclosed for conveying a food product having a wide variety of sizes and propelling the food product through a stationary knife assembly to cut the food product into discrete pieces. During the conveying of the food product, and elongated food product will be oriented such that its longer dimension is generally parallel to the conveyers before it encounters the cutting apparatus. The conveying apparatus utilizes a pair of endless belt conveyers oriented such that a run of one conveyer is located adjacent to a run of the other conveyer in order to grip a food product between the facing runs of the endless belt conveyers. A drive mechanism drives both of the endless belt conveyers at substantially the same speed so as to propel the food product through the stationary knife assembly. The conveying apparatus automatically adjusts to accommodate a wide variety of food product sizes by way of a spring-biased system acting on one or both of the facing conveyer runs.

4 Claims, 7 Drawing Sheets

APPARATUS FOR CONVEYING FOOD PRODUCTS OF VARYING SIZES

BACKGROUND OF THE INVENTION

The present invention relates to a conveying apparatus for conveying food products of varying sizes into a stationary cutting knife for cutting the food products into discrete pieces. More particularly, the invention relates to a conveying apparatus that will not only convey food products of varying sizes, but will also properly orient elongated food products while conveying them to the cutting apparatus.

Devices for cutting or slicing food products into discrete pieces of various shapes and sizes are well known in the art. One such known cutting devices is a "water gun" or hydraulic cutting system that is particularly used for cutting food products, such as potatoes, into slabs or strips. The hydraulic cutting system pumps a mixture of water and the food product to be cut through a pipe such that the product is propelled at a high rate of speed and caused to impact against a stationary cutting knife assembly which cuts the food product into the desired size portions. The resulting mixture of water and cut food product is then discharged and the food product is separated from the water. Water guns are capable of propelling the water and the food product through the knife assembly at a high production rate.

The stationary knife assembly utilized in a typical water gun device has a cutting head block to which is secured a plurality of elongated knife elements in parallel pairs such that they are disposed in a staggered relationship with a 90° offset with respect to adjacent pairs of knife elements. The cutting edges of the knife elements collectively define a plurality of rectangularly-shaped boxes for producing strips of food product having corresponding cross-sectional configurations. A conventional water gun system utilizing a stationary knife assembly of this type is disclosed in U.S. Pat. No. 4,766,793 to Fischer et al.

Another type of food product conveying apparatus replaces the water gun with a dual endless belt conveyer that grips the food product between opposing runs of the belts to propel the food product through the stationary knife assembly. The conveyers are guided by stationary belt guides which must be manually adjusted to accommodate food products of varying sizes. This device is disclosed in U.S. Pat. No. 5,044,240 to Fischer et al.

Another known apparatus for cutting elongated food products lengthwise into separate strips utilizes a single conveyer onto which the food products are fed and longitudinally aligned by a plurality of through walls. The aligned food product is thereafter conveyed to a rotating knife assembly which slits the food product into strips as disclosed in U.S. Pat. No. 3,109,469 to Urschel et al.

Conventional devices for conveying and cutting food products into a plurality of discrete pieces are large and expensive, particularly in the case of a water gun apparatus. Such known devices are also complex in design and often do not have the ability to operate at high production capacities, or to automatically adjust to accommodate a wide variety of food product sizes.

SUMMARY OF THE INVENTION

A conveying apparatus is disclosed for conveying a food product having a wide variety of sizes and propelling the food product through a stationary knife assembly to cut the food product into discrete pieces. During the conveying of the food product, an elongated food product will be oriented such that its longer dimension is generally parallel to the conveyers before it encounters the cutting apparatus.

The conveying apparatus utilizes a pair of endless belt conveyers oriented such that a run of one conveyer is located adjacent to a run of the other conveyer in order to grip a food product between the facing runs of the endless belt conveyers. A drive mechanism drives both of the endless belt conveyers at substantially the same speed so as to propel the food product through the stationary knife assembly.

The conveying apparatus automatically adjusts to accommodate a wide variety of food product sizes by way of a spring-biased system acting on one or both of the facing conveyer runs. A belt slide extends along one or both of the facing conveyer belt runs and is in sliding contact with opposite lateral sides of the endless conveyer belts. A center portion of each of the belt slides has a concave configuration with the concavity opening towards the associated endless conveyer belt which enables the center of the conveyer belt to be deformed by the food product into the concavity of the belt slide, while at the same time gripping the food product between the facing endless belt runs.

Each belt slide is attached to a stationary frame work by a spring-biased mounting system which enables the belt slide and the associated endless belt conveyer run to be displaced away from the facing conveyer belt run by large sized food products. The food product is still gripped between the facing conveyer belt run so as to be conveyed into the cutting knife assembly. The force of the spring-biased mounting system exerted on the belt slides is balanced such that the belt slide will move to accommodate the food product before deformation of the center of the belt causes contact between the endless conveyer belt and the belt slide, which could possibly cause the apparatus to stall.

The endless conveyer belts each extend around a pair of rollers each having a convex outer surface with a central diameter greater than the diameters of the opposite lateral ends of the rollers. The convex outer surfaces of the rollers centers the endless conveyer belts on the rollers and prevents significant lateral movement of the endless conveyer belts.

DETAILED DESCRIPTION OF THE PREFERRED EMBODIMENTS

Figure 1:
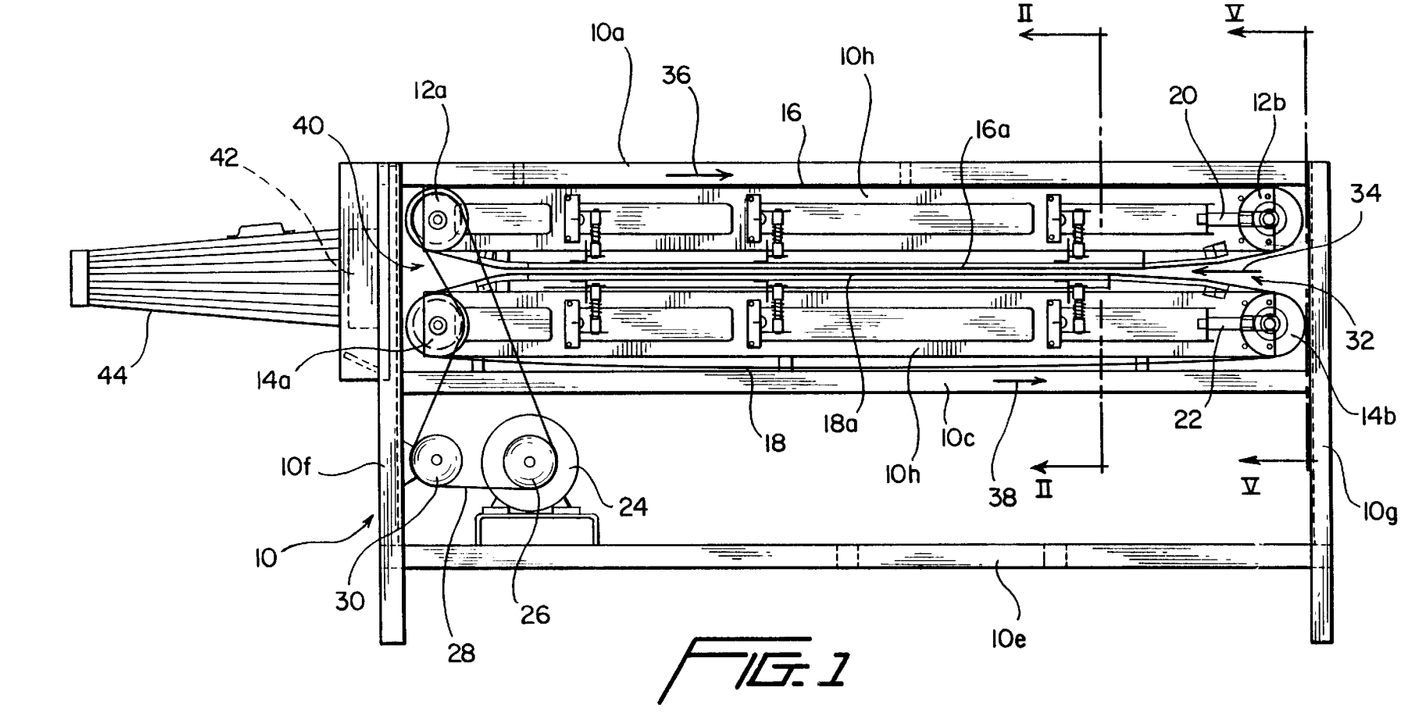
FIG. 1 is a side view of the conveying apparatus according to the present invention.

The conveying apparatus according to the present invention, as best seen in FIG. 1, comprises a stationary frame work 10 comprising a pair of upper, longitudinally extending frame rails 10a and 10b, a pair of lower, longitudinally extending frame rails 10c and 10d and lower brace 10e. A first pair of legs 10f and a second pair of legs 10g are interconnected to the ends of the brace and the frame rails, and are interconnected by laterally extending frame rails (not shown). Side panels 10h extend between the opposite pairs of legs 10f and 10g between the upper and lower frame rails 10a and 10c, as well as between upper and lower frame rods 10b and 10d and serve as mounts for rollers 12a and 12b, and rollers 14a and 14b. In known fashion, the rollers 12a, 12b, 14a and 14b are rotatably attached to the side panels 10h. Endless belt 16 extends around rollers 12a and 12b while endless belt 18 extends around rollers 14a and 14b. Rollers 12b and 14b may be attached to the opposite side panels 10h by tension adjusting devices 20 and 22 to enable the positions of the rollers to be adjusted so as to adjust the tension in endless belts 16 and 18.

A driving motor 24, or other power source, has driving pulley 26 attached thereto which drives endless belt 28 which is in driving contact with rollers 14a and 12a such that rotation of driving pulley 26 rotates rollers 12a and 14a in opposite directions at the same speed so as to drive endless belts 16 and 18 at the same linear speed. Idler pulley 30 may also be engaged with endless drive belt 28 and attached to the stationary frame work 10 by any known means to enable the adjustment of the tension in endless belt 28.

Endless belt 16 has a first run 16a that is adjacent to and faces a run 18a of endless belt conveyer 18. Runs 16a and 18a define between them a feed throat 32 into which a food product is fed by a chute (not shown), a feed hopper (not shown), or the like in the direction of arrow 34. As can be seen, movement of the endless conveyer belts 16 and 18 in the direction of arrows 36 and 38, respectively, will convey the food product from the feed throat 32 to a discharge 40 as the food product is gripped between the facing runs 16a and 18a of the conveyers. The food product will be conveyed with sufficient velocity to pass through a stationary knife assembly 42 and the cut food product will be received by receiver 44 which is removably attached to the stationary frame 10. Any type of known stationary knife assembly 42 may be utilized with the instant invention. The specific construction of a stationary knife assembly forms no part of the present invention.

Figure 2:
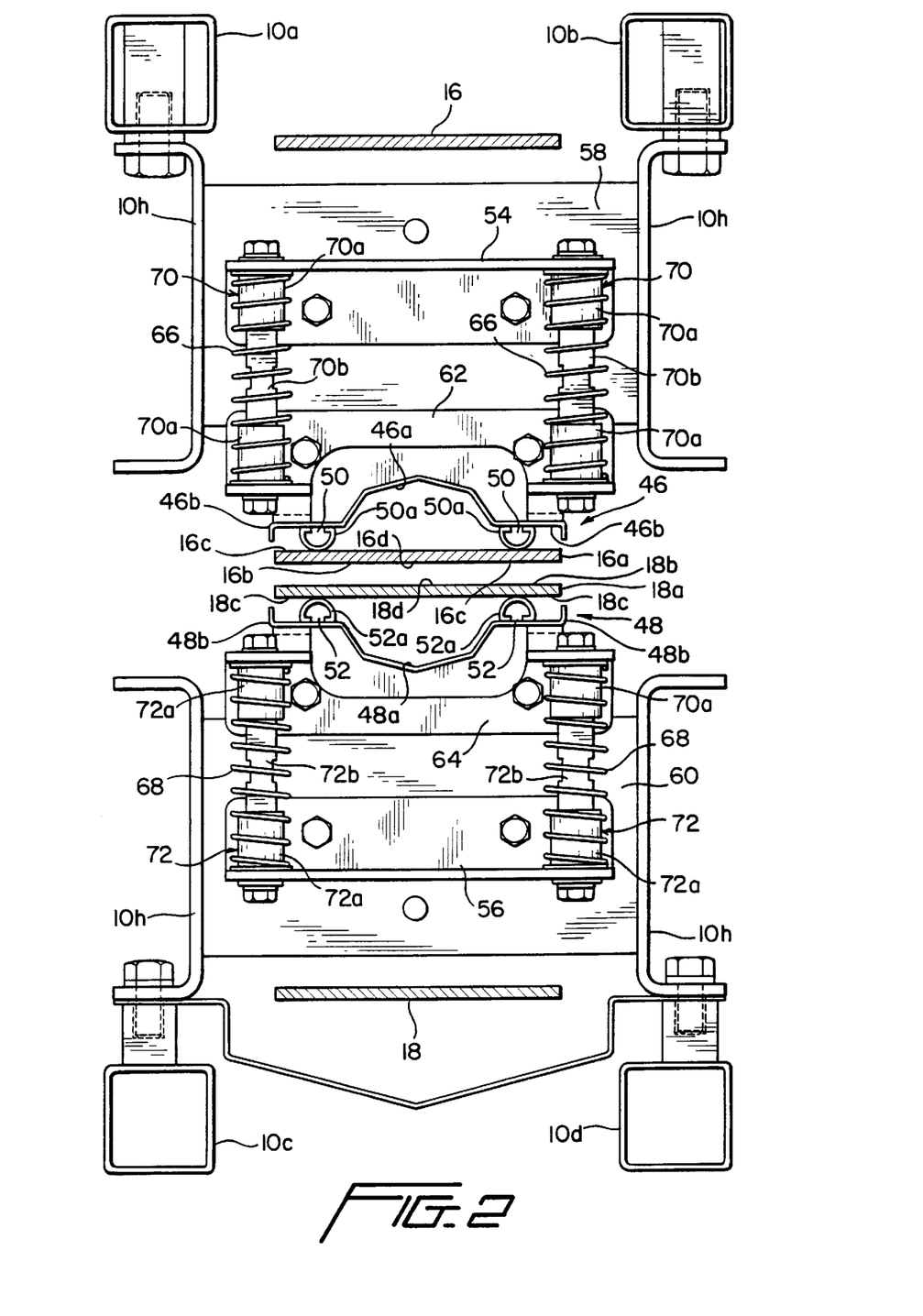
FIG. 2 is a cross-sectional view taken along Line II—II in FIG. 1.

The conveying apparatus according to the present invention is able to accommodate a wide variety of food product sizes via a conveyer slide system illustrated best in FIG. 2. Conveyer slides 46 and 48 may extend substantially along the first runs 16a and 18a of the conveyers 16 and 18 and are in sliding contact with the conveyer runs on sides opposite to the respective gripping surfaces 16b and 18b between which the food product is gripped. The conveyer slides 46 and 48 each comprise a central concave portion 46a and 48a, respectively, in which the concavity opens toward the respective conveyer run 16a or 18a. Opposite lateral side portions 46b and 48b are located on opposite sides of each respective central portion 46a and 48a. The lateral side portions 46b and 48b are in sliding contact with opposite lateral side portions of the conveyer runs 16a and 18a by slide elements 50 and 52 attached to the respective slides 46 and 48. The slide elements 50 and 52 may be formed of low friction plastic or plastic like material, or may have a replaceable plastic or plastic like cover 50a and 52a mounted thereon to reduce the friction between the conveyer runs 16a and 18a , and the conveyer slides 46 and 48. The plastic covers may be of any known material and may be attached to the slide elements in any known manner which will enable their replacement should they become worn. The slide elements 50 and 52 slidably contact opposite lateral side portions 16c of conveyer run 16a and opposite lateral side portions 18c of conveyer run 18a.

Figure 3:
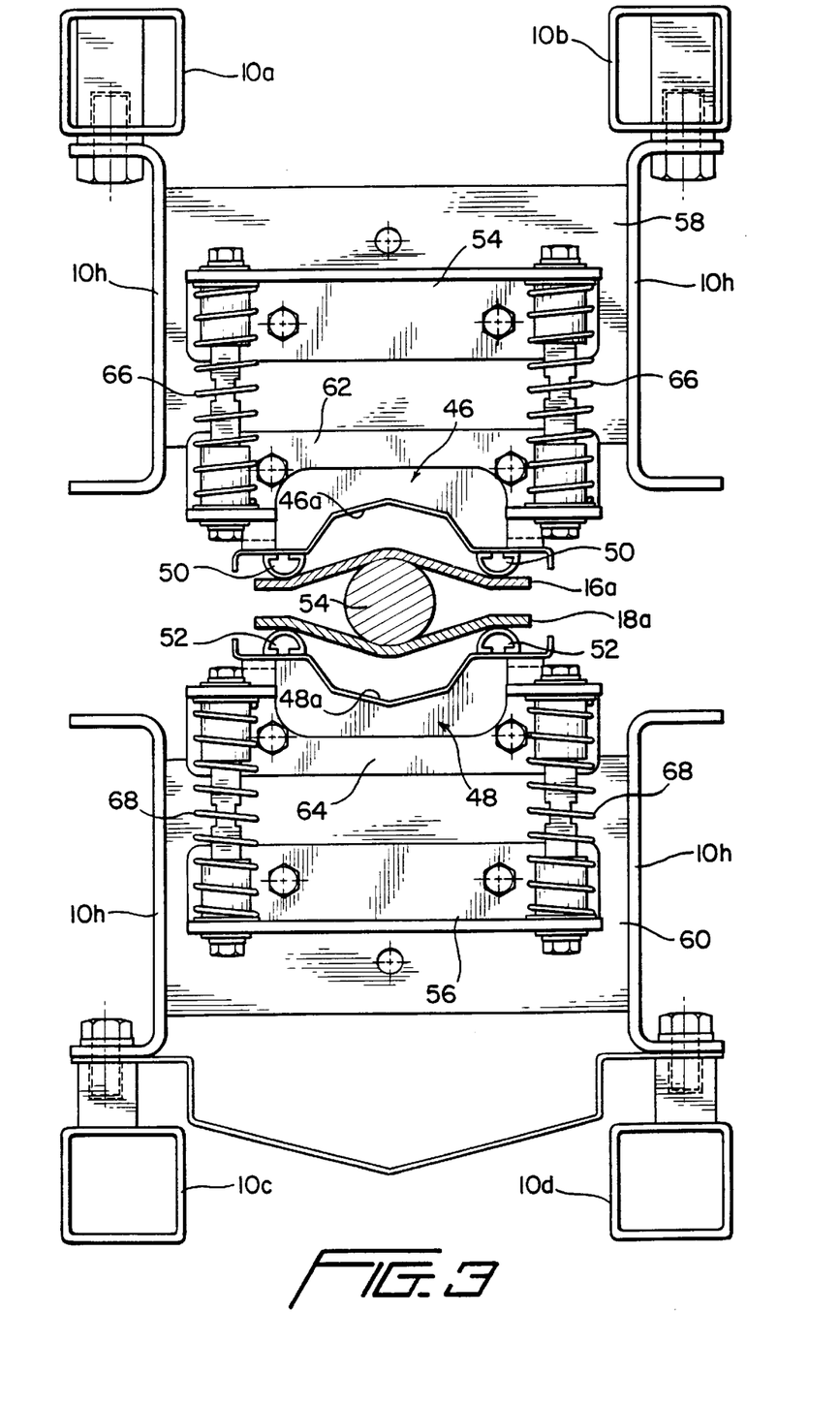
FIG. 3 is a cross-sectional view similar to FIG. 2, illustrating the facing conveyer belts gripping a food product.

As best illustrated in FIG. 3, the sliding contact between the slides 46 and 48 on opposite lateral sides of the conveyer runs 16a and 18a allows the respective center portions 16d and 18d to deflect outwardly, away from each other into the concavities 46a and 48a such that the conveyer runs 16a and 18a will grip a food product 54, therebetween. Contact between the center portions 16d and 18d and the respective center concavity 46a or 48a should be avoided to avoid excessive frictional forces between the endless conveyer belts and the conveyer slides which could, in extreme cases, cause the drive system to stall and prevent feeding of the food product through the stationary knives.

In order to avoid this possibility and to enable the apparatus to accommodate a wide variety of food product sizes, the slides 46 and 48 are attached to the machine frame 10 by spring-biased mounting systems. These systems comprise stationary brackets 54 and 56 attached to the stationary frame 10 via cross members 58 and 60. Brackets 62 and 64 are attached to the slides 46 and 48, respectively. Springs 66 extend between brackets 54 and 62, while springs 68 extend between brackets 56 and 64 so as to bias the slides 46 and 48 towards each other. Springs 66 and 68 are illustrated as comprising compression coil springs but, quite obviously, other types of biasing elements may be substituted therefore without exceeding the scope of this invention. Guide assemblies 70 and 72 may be located within springs 66 and 68, respectively, and may comprise end portions 70a and 72a interconnected by guide rods 70b and 72b. The guide rods may be slidably inserted in one of the end caps for each spring to enable the slide 46 and bracket 62 to move towards bracket 54 and to enable the slide 48 along with bracket 64 to move towards bracket 56.

Figure 4:
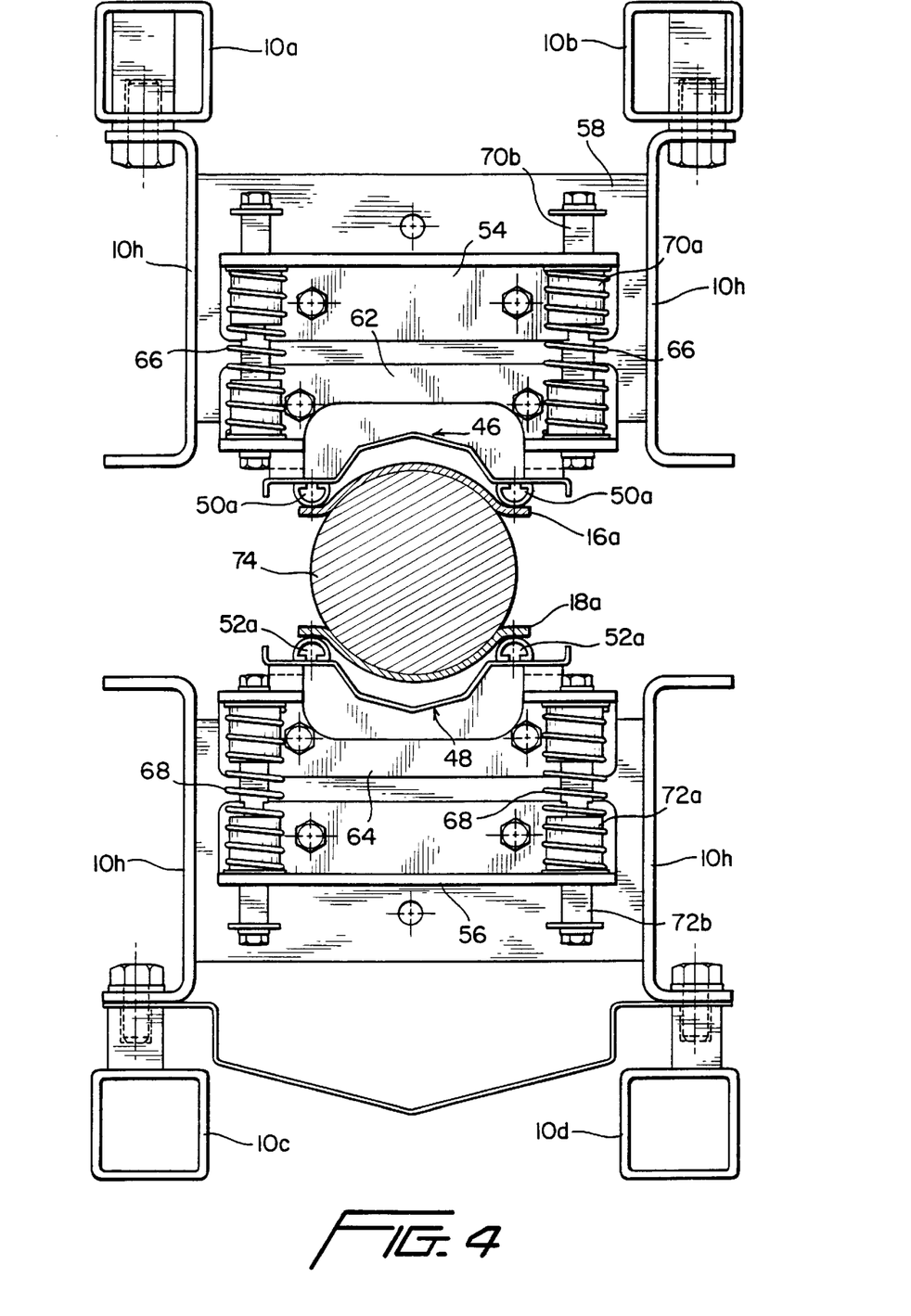
FIG. 4 is a cross-sectional view similar to FIG. 3, illustrating the conveyer belts gripping a food product of larger size.

When a first sized food product 54 is conveyed by the apparatus according to the invention, as best illustrated in FIG. 3, the center portions 16d and 18d of the conveyer runs 16a and 18a will be deformed into the concavities 46a and 48a such that the food product 54 is gripped between the gripping surfaces 16b and 18b on the conveyer belts and conveyed into the stationary knife assembly. The size of the food product 54 is sufficient to deform the center portions 16d, 18d of the endless conveyer belts, but is insufficient to compress springs 66 or 68. When a second, larger food product 74 is conveyed, as best seen in FIG. 4, not only will the center sections 16d and 18d be deformed into the concavities 46a and 48a, but the slides 46 and 48 will move outwardly, away from each other and compress springs 66 and 68 such that brackets 62 and 64 move towards brackets 54 and 56, respectively. This enables the larger food products 74 to be accommodated by the conveyer system, and also enables the larger product to be conveyed with sufficient speed to pass through the stationary knife assembly without incurring deleterious frictional contact between the endless conveyer belts 16 and the conveyer slides 46 and 48. As can be seen in FIG. 4, the guide rods 70b and 72b extend through the end caps 70a and 72a to enable the springs to compress while at the same time preventing undue lateral motion of the conveyer slides 46 and 48.

Figure 5:
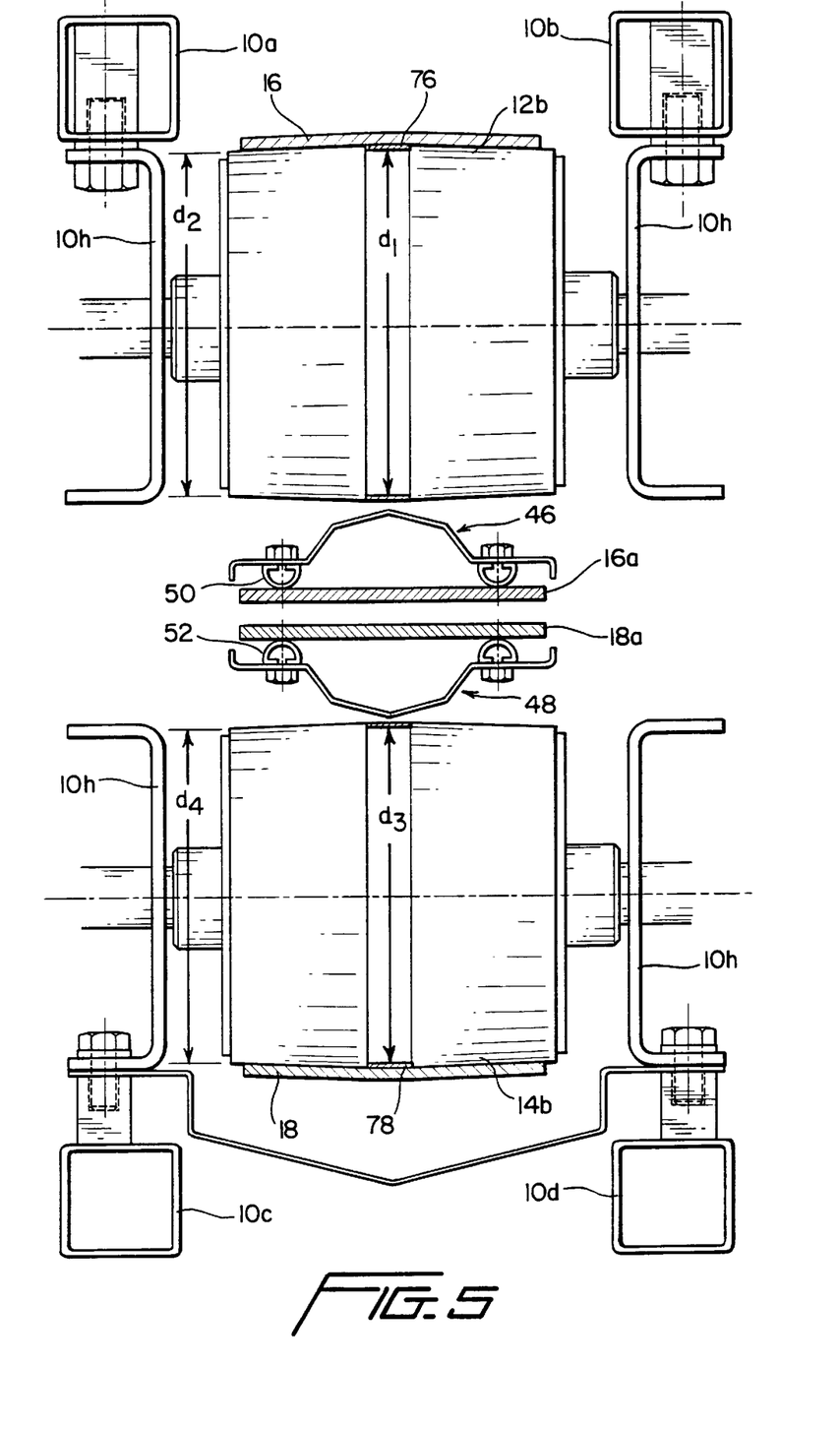
FIG. 5 is a cross-sectional view taken along Line V—V in FIG. 1.
Figure 6:
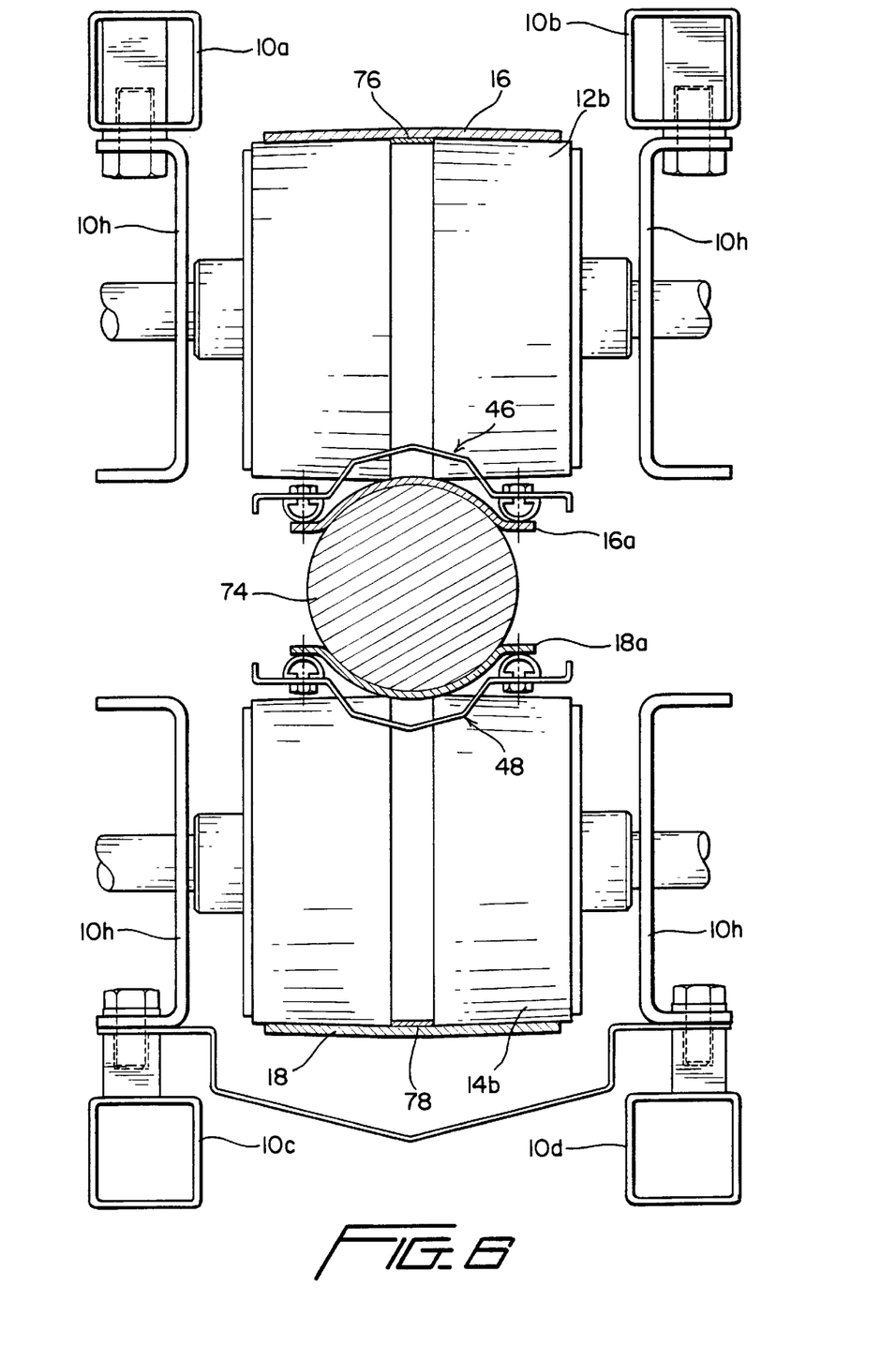
FIG. 6 is a cross-sectional view similar to FIG. 5, illustrating the endless conveyer belts gripping a large-sized food product.

Rollers 12a, 12b, 14a and 14b each have a generally convex outer surface. As illustrated in FIG. 5, a central portion of each of the rollers has a diameter of $d_1$ and $d_3$, respectively. The diameters of the opposite lateral ends of each of the rollers have diameters of $d_2$ and $d_4$, respectively such that $d_1$ is greater than $d_2$ and $d_3$ is greater than $d_4$. The crowned rollers 12a, 12b, 14a and 14b will serve to center the endless belts 16 and 18 thereon to prevent any undue lateral movement of the endless belts. To increase the grip between the rollers and the endless belts, the crowned central portions of each roller may have a band of urethane belting 76 extending around the central circumference in contact with the belts 16 and 18. As illustrated in FIG. 6, the spacing between adjacent rollers 12*a* and 14*a* and 12*b* and 14*b* will limit the overall size of the food product 74 which can be accommodated by the instant conveying apparatus.

Figure 7:
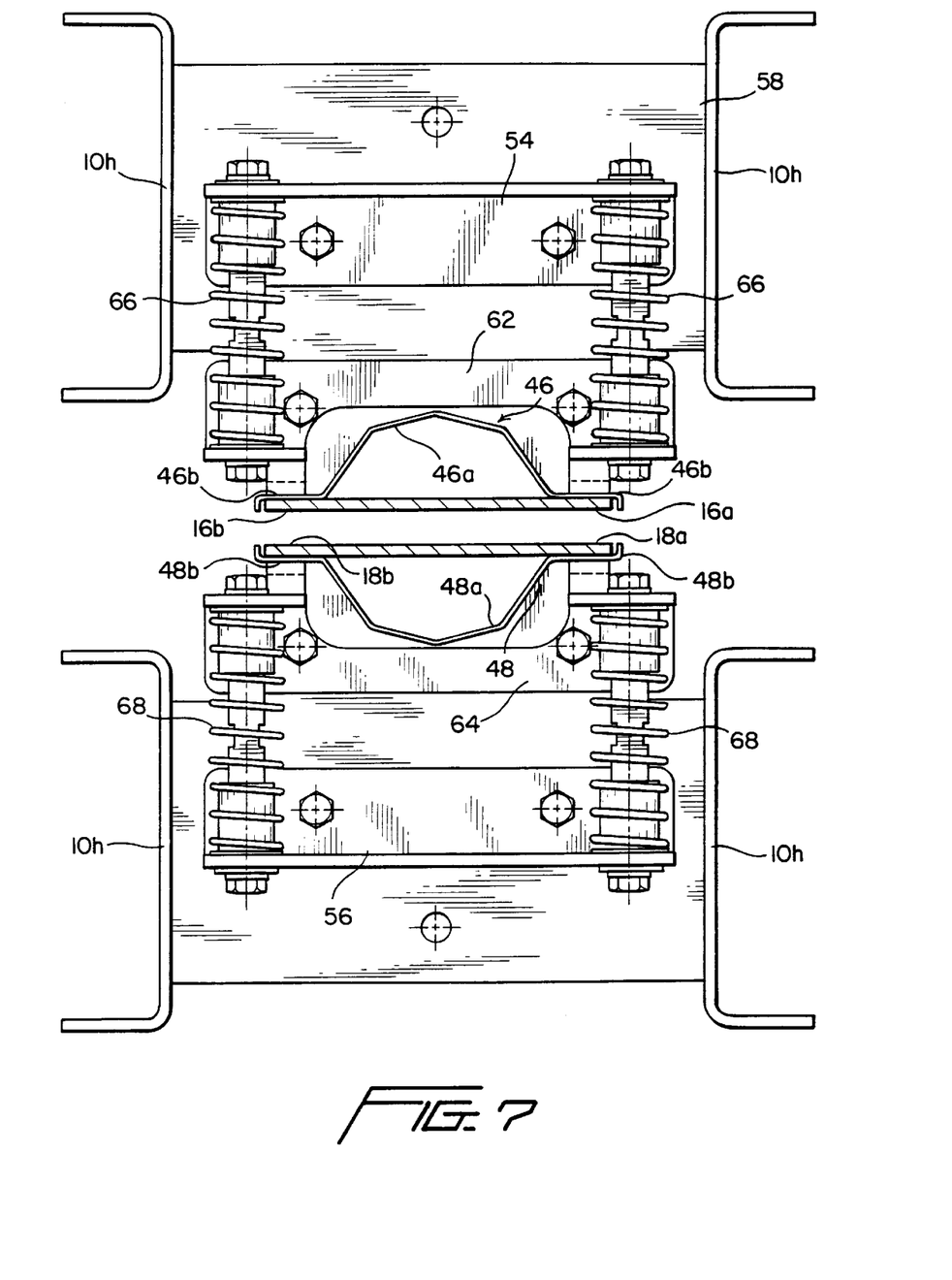
FIG. 7 is a cross-sectional view similar to FIG. 2, illustrating another embodiment of the belt slides.

FIG. 7 is a cross-sectional view similar to FIG. 2, but illustrating another embodiment of the instant invention. This embodiment is the same as the previously described embodiment, except for the omission of the slide elements 50 and 52 from the slides 46 and 48, respectively. In this embodiment, lateral side portions 46*b* of slide 46 bear directly against the opposite lateral side portions 16*c* of conveyer run 16*a*. Similarly, the opposite lateral side portions 48*b* of slide 48 bear directly against the opposite lateral side portion 18*b* of conveyer run 18*a*. The slide mountings, the slide and the conveyers are all exactly the same as those previously described.

Experiments utilizing the above-described conveyer system have successfully conveyed food products ranging in size from approximately 0.750 inches to 3.5 inches in cross-sectional dimension, the upper limit of the food product being defined by the vertical spacing between the adjacent conveyer belt rollers. The belts should cup around and grip any sized product to accelerate the food product to a speed at which it will pass through the stationary cutting device and to also have a centering effect on the food product. With elongated food products, the gripping of the belts will orient the food product such that its longest dimension is generally parallel to the conveying path to provide the best possible cut food product. Springs 66 and 68 are stiff enough to force the belts to cup around and grip the food product, but must be weak enough to compress before the belts are forced against the belt slides causing excessive friction and possible apparatus stalling.

The foregoing description is provided for illustrative purposes only and should not be construed as in any way limited this invention, the scope of which is defined solely by the appended claims.

We claim:

1. Apparatus for conveying and cutting a food product comprising:

a) a first endless belt conveyor having a first flexible endless belt with a first gripping surface and a first run having a first longitudinal center and first lateral sides;

b) a second endless belt conveyor having a second flexible endless belt with a second gripping surface and a second run having a second longitudinal center and second lateral sides, the first and second endless conveyors located such that the first and second gripping surfaces face each other;

c) a first belt slide in sliding contact with al least a portion of the first lateral sides of the first flexible endless belt;

d) a second belt slide in sliding contact with at least a portion of the second opposite lateral sides of the second endless belt, each belt slide comprising a continuous elongated body having opposite lateral side portions in sliding contact with the lateral sides of the associated endless belt and a concave center section extending between the opposite lateral side portions such that the center section forms a concavity opening toward the associated endless belt and extending substantially along lengths of the first and second runs to enable the longitudinal centers of the first and second endless belts to deform away from the other endless belt so as to frictionally grip a food product between the first and second endless belts while the lateral sides of each belt are continuously supported by the belt slide;

e) a resilient mounting connected to at least one of the belt slides so as to bias the associated endless belt toward the other of said endless belts and enabling said associated endless belt to be displaced away from the other of said endless belts so as to fictionally grip a variety of food product sizes between the first and second endless belts; and, f) a knife assembly located at an end of the first and second runs to receive and cut the food product.

2. The apparatus of claim 1 wherein the resilient mounting comprises a spring acting on the at least one belt slide.

3. The apparatus of claim 2 wherein the spring comprises a compression coil spring.

4. The apparatus of claim 1, wherein said lateral side portions of the belt slides include low friction slide elements extending along the lengths of said lateral side portions, said slide elements being in contact with the lateral sides of each associated endless belt.

\* \* \* \* \*